J. ROSCHACH.
MACHINE ELEMENT.
APPLICATION FILED APR. 7, 1917.

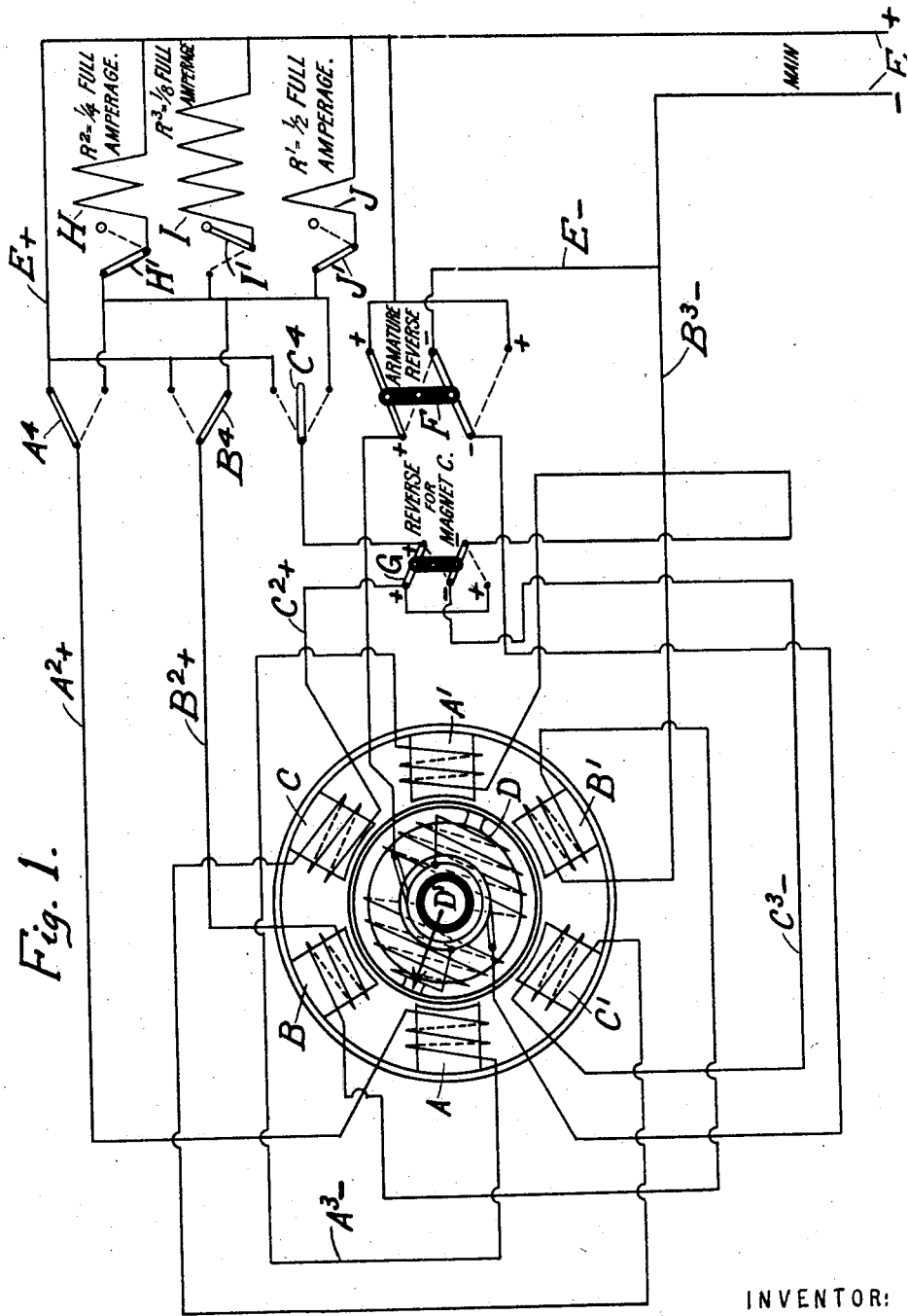

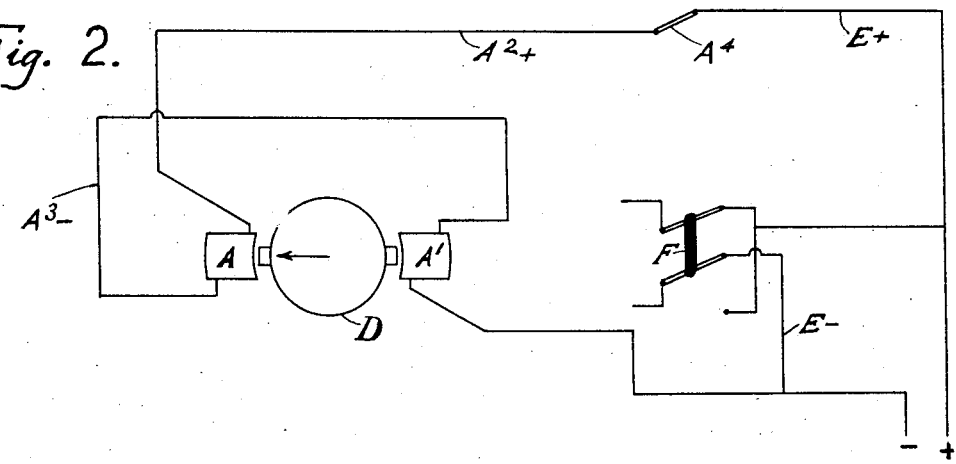
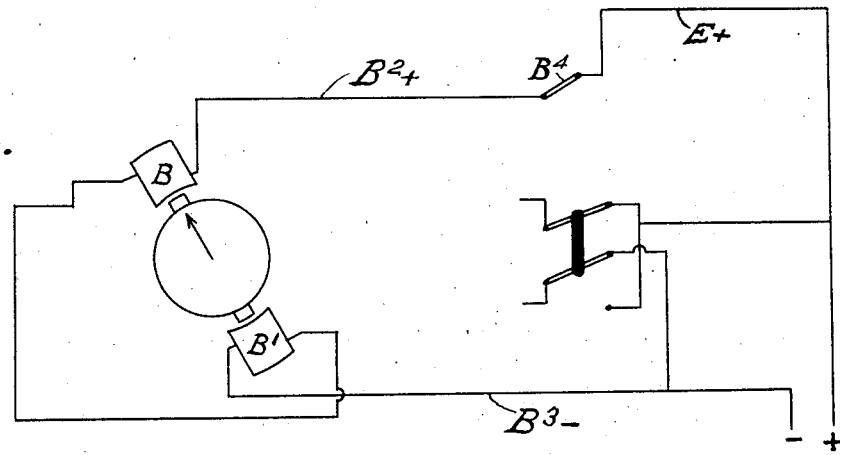
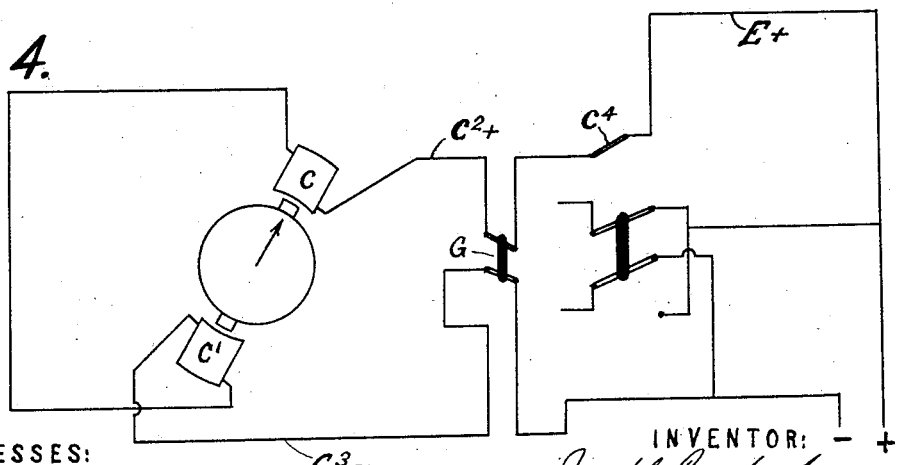

1,402,797.

Patented Jan. 10, 1922.

WITNESSES:
Julius Duckstine
Arthur G. Johnson

INVENTOR:
Joseph Roschach
BY B.C. Stickney
ATTORNEY

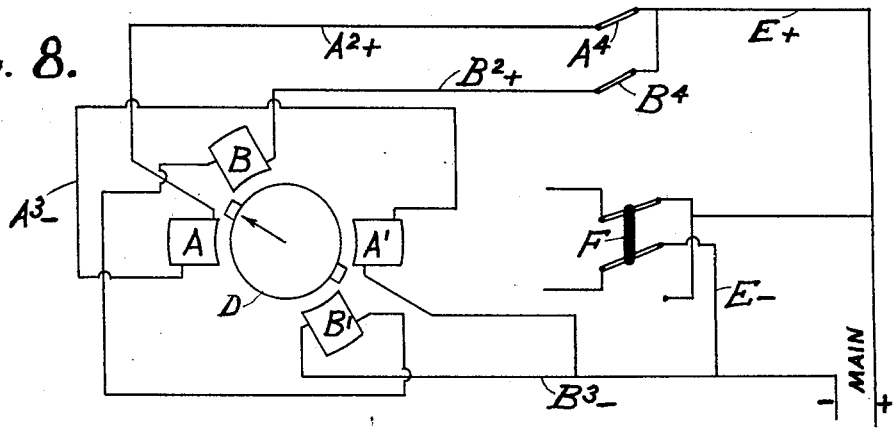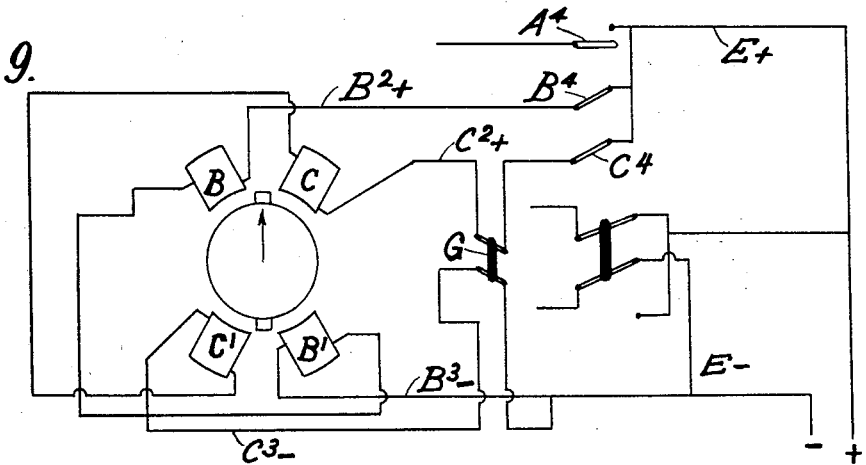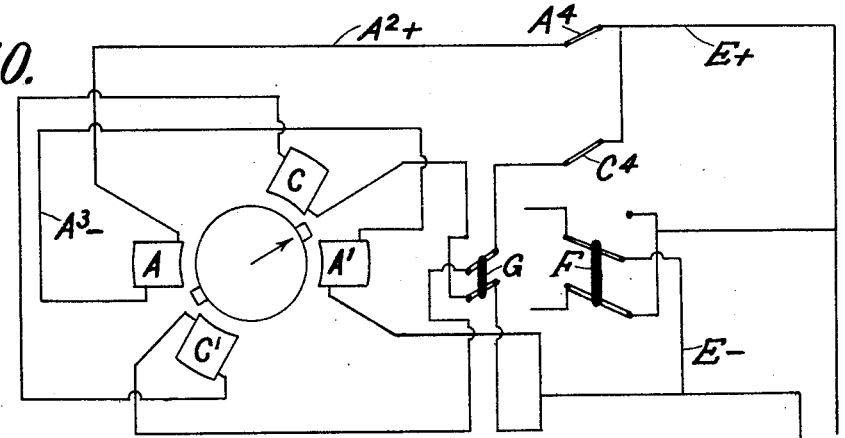

J. ROSCHACH.
MACHINE ELEMENT.
APPLICATION FILED APR. 7, 1917.

1,402,797.

Patented Jan. 10, 1922.

WITNESSES:
Julius Duchstine
Arthur A. Johnson

INVENTOR:
Joseph Roschach
BY B. C. Stickney
ATTORNEY

J. ROSCHACH.
MACHINE ELEMENT.
APPLICATION FILED APR. 7, 1917.

1,402,797.

Patented Jan. 10, 1922.
6 SHEETS—SHEET 6.

UNITED STATES PATENT OFFICE.

JOSEPH ROSCHACH, OF CAMPGAW, NEW JERSEY.

MACHINE ELEMENT.

1,402,797.　　　　　Specification of Letters Patent.　　Patented Jan. 10, 1922.

Application filed April 7, 1917. Serial No. 160,417.

*To all whom it may concern:*

Be it known that I, JOSEPH ROSCHACH, a citizen of Switzerland, residing in Campgaw, in the county of Bergen and State of New Jersey, have invented certain new and useful Improvements in Machine Elements, of which the following is a specification.

This invention relates to improvements in machine elements used for the purpose of effecting variable movements, and one of the features consists in the arrangement of improved means for moving a part different extents from any one of a number of stations; such movement being preferably effectible in either direction from any station.

The variable movement or position-finding device herein disclosed depends upon an adaptation of magnetic devices. There is employed a series of devices of this character under the control of a permutation device, which may effect the movement of an armature or corresponding part, to an extent dependent upon the setting of the permutation device. A simple form of the invention consists in an armature co-operating with a set of field magnets, each field magnet having an individual circuit, to be energizable independently of the other magnets, so as to separately control the position of the armature; and hence the armature may move to as many stations as there are field magnets. Each field magnet may comprise two poles, and provision may be made for effecting relative pole-changing between the armature and the set of field magnets, so that each magnet may bring the armature to opposite positions. Thus, there will be twice as many stations for the armature as there are field magnets.

Moreover, the field magnets may be used in combination, as, for example, any two adjoining magnets may be energized while the remaining magnet, or magnets are deenergized, so that the armature will occupy a midway position respecting the energized magnets. This doubles the number of stations for the armature, so that there may be four times as many stations as there are field magnets. For one of the individual magnets there may be employed a pole-changing device, so that it may combine with an adjoining magnet, which would otherwise be of different sign.

Further provision may be made for varying the power of different field magnets, so that when any two field magnets are combined they may co-operate to position the armature at any one of a large variety of stations, according to the variable relative power of the magnets, one being very strong and the other very weak, or vice versa, or one having full power and the other having half power, and so on, through a large number of permutations. Altogether there may be, if desired, thirty-two times as many stations for the armature as there are field-magnets employed, although the number of stations may be greater or less, as desired.

The variation in the power of the magnets may be secured by the employment of a regulator for the circuits, preferably in the form of a rheostat, which may have resistance coils connected in parallel, so that one or more of them may be cut into a circuit of any field magnet.

One of the advantages of the invention when employed in this preferred form, is the adaptability of the position-finder in being able to move from any station in a circle in either direction to any one of a large number of other stations, so that it may be given from any point any desired length of stroke within the power of the device.

Other features and advantages will hereinafter appear.

In the accompanying drawings,

Figure 1 is a view of the preferred form of the invention, shown as a diagram, the armature being shown mounted upon a shaft which it may be desired to position at any one of a variety of stations.

Figures 2 to 16 are partial diagrams showing how the armature and its shaft may be brought to a variety of positions selectively; such circuits as are not in use being omitted from the various diagrams.

Figure 2 shows the armature positioned by one of the field magnets; Figure 3 shows the armature positioned by another field magnet; and Figure 4 by still another.

Figure 5 shows the armature positioned by the same magnet as at Figure 2, but brought to an opposite position by the use of a pole-changer; Figure 6 shows the armature brought to opposite position from that at Figure 3; and Figure 7 the opposite from that at Figure 4.

Figure 8 shows magnets combined to position the armature at a station midway between the position at Figures 2 and 3;

Figure 9 showing the corresponding positioning between those at Figures 3 and 4; and Figures 10, 11, 12 and 13 show the armature positioned at a further succession of midway positions.

Figure 12:
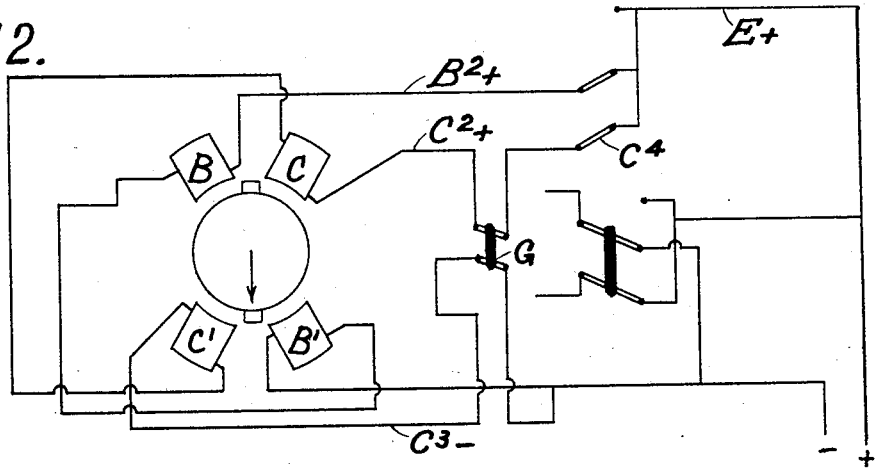
Figure 13:
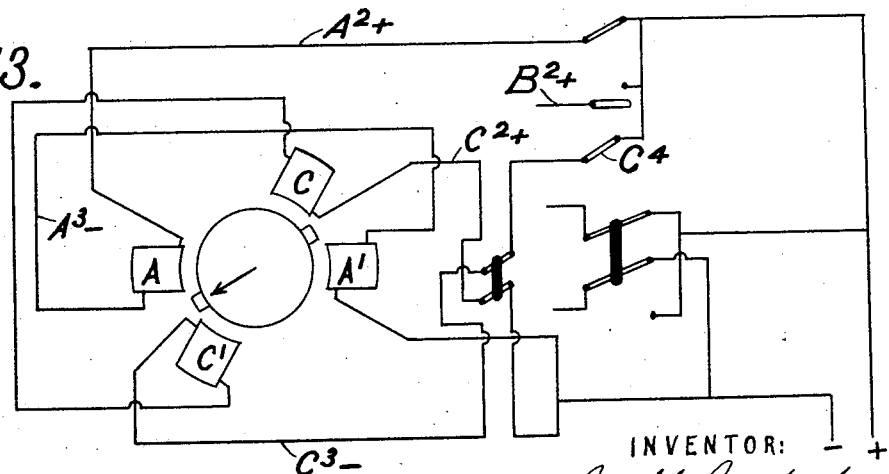
Figure 14:
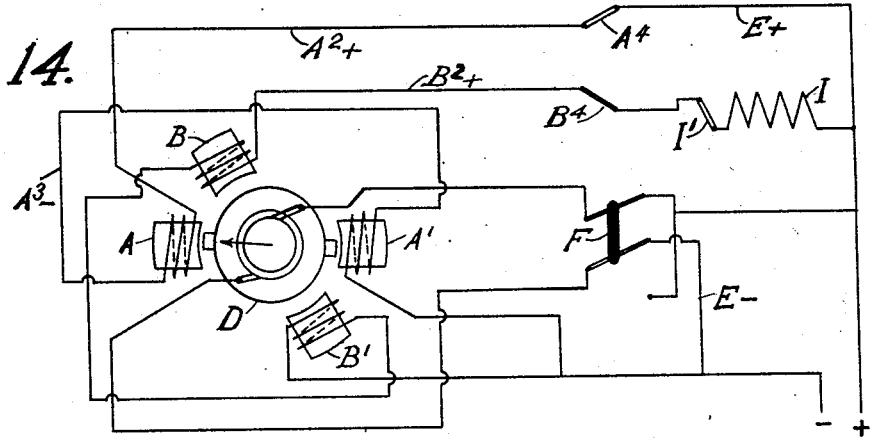
Figure 15:
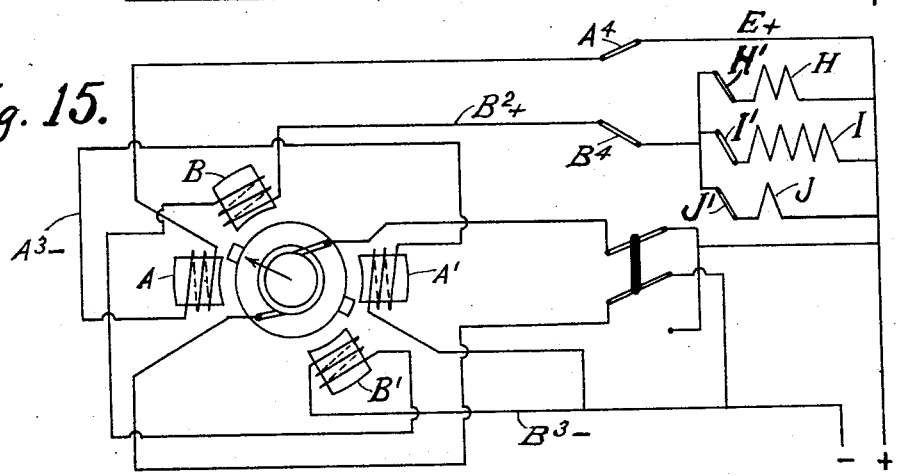
Figure 16:
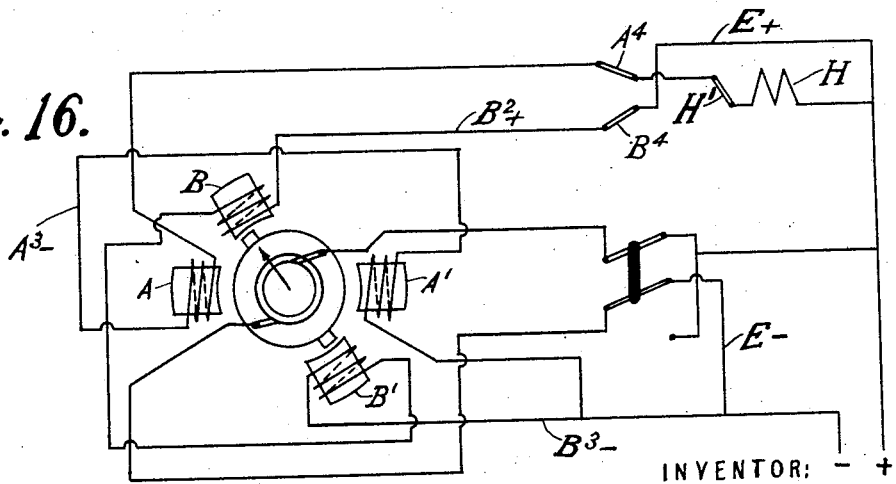

Figures 14 to 16 are illustrative examples to show the employment of a rheostat for reducing the current energizing one of the magnets in a combination, so as to vary the positions of the armature from any of the main stations at Figures 2 to 13. The number of possible variations is large.

At Figure 14, a magnet B is weakened, and a magnet A, combined therewith, is of full strength, so that the position of the armature is very near what it would be if the magnet B were cut out.

At Figure 15, the magnet A is of full strength and the magnet B is of nearly full strength, so that the armature is brought very nearly to midway position.

At Figure 16, the magnet B is of full strength while the magnet A is very weak, so that the armature stands very nearly in the position it would occupy if magnet A were cut out.

In the drawings, which give one form of the invention as illustrative, field magnets A, B, C (whose opposite poles are seen at A', B' and C', respectively), encircle an armature D, whereby relative revolution may be effected between the armature and the set of field magnets. For convenience, the armature is illustrated as the rotatable member.

At Figure 1, the magnet A is connected to a main through a circuit $A^2$, $A^3$, the magnet B through a circuit $B^2$, $B^3$, and the magnet C through a circuit $C^2$, $C^3$. The main wires are indicated at E. By means of these individual circuits, the field magnets may be brought into use singly for positioning the armature D at different stations, to rotate its shaft D' as may be required. The circuit for the magnet A has a circuit-closer $A^4$, shown closed at Figure 2, so that the magnet A is energized and the armature D brought to a corresponding position, indicated by an arrow shown thereon, as pointing to the center of the magnet A.

From this position, the armature may be moved by opening the switch $A^4$ to de-energize the magnet A and closing the switch $B^4$, to energize the magnet B, as at Figure 3. The armature is thus caused to turn from the Figure 2 position to the Figure 3 position, where the armature arrow points to the center of the magnet B. The armature may be caused to take still another step, by opening the circuit at $B^4$ and closing the circuit at $C^4$, as at Figure 4, so that only the magnet C is energized, and, hence, the armature turns until the arrow points to the middle of magnet C. Thus, the armature (or any shaft or machine part connected thereto) may be positioned at any of three stations, by simply opening and closing the circuits selectively. Moreover, the armature may be caused to move in either direction; as for example, if it be desired to have it turn from station C, at Figure 4, to station B, at Figure 3, it is only necessary to open the switch $C^4$ and close the switch $B^4$, and in a like manner the armature can then be turned back from station B to station A.

Figure 5:
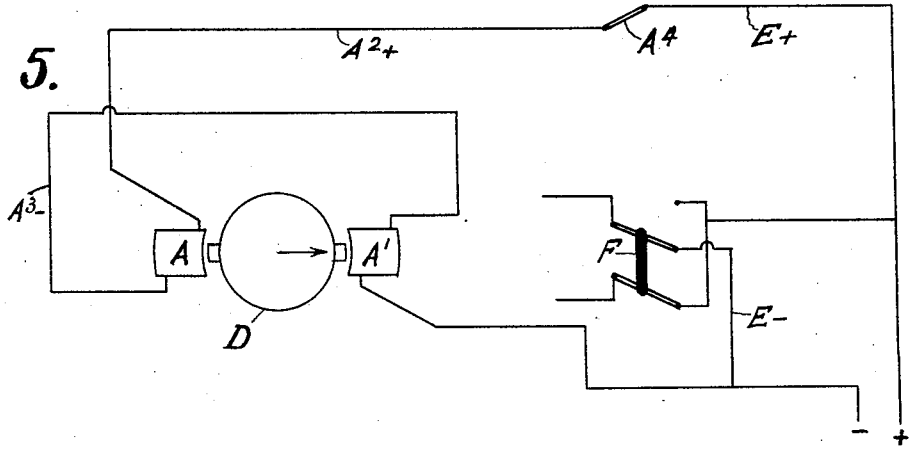

The poles of the armature may be changed in sign by use of a current-reversing device F, so that, by closing the circuit of the magnet A, the armature will be caused to move from magnet or station C to the position seen at Figure 5, which is opposite to the Figure 2 position. Hence, a single magnet may serve to position the armature at either of two stations.

Figure 6:
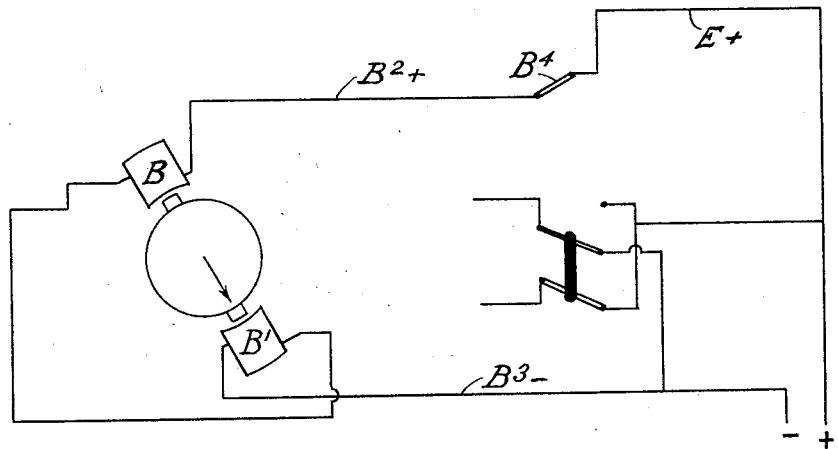

With the current-reverser F remaining in the same position, the magnet A may be de-energized and the magnet B energized by closing the switch $B^4$, as at Figure 6, whereupon the armature will turn from the Figure 5 position (where its arrow points to the pole A') to the Figure 6 position, where the arrow points to the pole B'.

Figure 7:
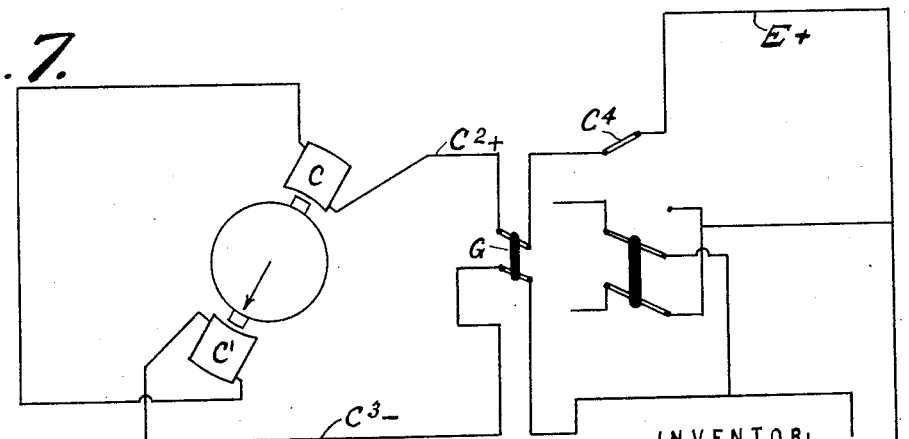

At Figure 7, the reverser or pole-changer F remains in the same condition as at Figure 5, but the switch $B^4$ is open, and a circuit is closed through magnet C, so that the armature is turned until its arrow points to the pole C'.

It will be understood that if it should now be desired to return the armature to the station B', it would be only necessary to open the circuit through C and close the circuit through B. But, if it should be desired for the armature to advance to the Figure 3 position, this could be accomplished by restoring the pole-changer F to its original position and by opening the circuit through C and closing the circuit through A.

While there are shown three sets of magnets or six magnet poles, it will be understood that this number is used only for illustration, as either a greater or a less number of magnets or sets of magnets or poles would fall within the scope of the invention. While the poles are arranged in a circle, forming a set which surrounds the armature, still such arrangement is not essential in all cases.

To provide an additional series of stations or substations for the armature, the field magnets may be used in combination, for example, in Figure 8, the individual circuits are seen closed for both A and B, so that both magnets are energized, thus causing the armature to assume the Figure 8 position, as indicated by the arrow, from either the position at Figure 2, or the position at Figure 3; the pole-changer F being in the same position as at Figures 2 and 3. In like manner, the armature can be rotated to a station midway between B and C, as at Figure 9, where the circuit through A is open and the circuits through B and C are closed.

In order to establish the armature at a station midway between poles C and A', the poles of the armature are reversed in sign by means of the pole-changer F. Provision is made for individual reversing of C by means of a pole-changer G. Hence the armature is brought to a station midway between pole C and pole A', as indicated by the arrow at Figure 10.

Figure 11:
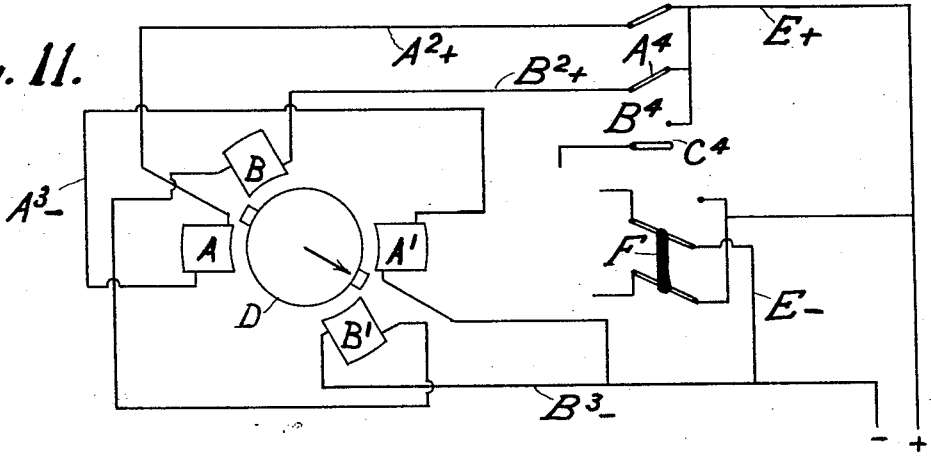

At Figure 11, the armature is moved to a station between poles A' and B'; the pole-changer F remaining in the same position as at Figure 10, and the circuit of the magnet C being open.

At Figure 12, the armature D is moved to a position between poles B' and C'; the pole-changer G having been restored to a first position, see Figure 1, so that the signs of the magnets of the poles B' and C' shall be the same.

At Figure 13, the magnets A and C are combined to bring the armature to a position midway of the poles A and C', which is the opposite from the position seen at Figure 10; and it will be noted that the pole-changer F has been restored to its original position, seen at Figure 1. At that time, the individual pole-changer G has been shifted from the Figure 1 position to reverse the current flowing around the magnet C, so that poles A and C' shall have the same sign.

Thus, the armature may be positioned at twice as many stations as there are magnet poles, and has a to-and-fro movement as required, so that it may move from any station in either direction to, or past, the adjacent pole, according to the setting of the permutation system, which includes circuit-closers $A^4$, $B^4$, $C^4$, and the pole-changers F and G. In other words, the positioning device is capable of altering the position of a part from a certain station in either direction to any selected one of several different stations.

The number of stations at which the armature may be positioned may be still further multiplied by the employment of a rheostat, comprising resistance coils H, I, J, corresponding, respectively, with $\frac{1}{4}$, $\frac{1}{8}$ and $\frac{1}{2}$ full amperage. This is used simply for illustration, as other resistance coils or other regulating apparatus may be employed for varying the power of the magnets individually.

At Figure 14, the current is unimpeded around magnet A, while in the circuit around magnet B, there is introduced a great resistance, so as to give only $\frac{1}{8}$ of normal amperage in this circuit, and hence the power of the magnet B is greatly decreased, and therefore it is unable to draw the armature to the position at Figure 8 (where the magnets A and B have equal power); but said armature is positioned at a station determined by the combined effect of the strong magnet A and the weak magnet B, which is illustrated at Figure 14, where the armature is advanced a little toward B from the central position, seen at Figure 2. Thus, the use of resistance or other means for regulating the power of the magnet B provides additional stations for the armature D.

At Figure 1, the circuit is closed around the magnet A with full amperage; while the circuit of the magnet B includes two of the resistance coils, namely, the coils H and J which pass respectively $\frac{1}{4}$ and $\frac{1}{2}$ of the full amperage. Hence, the armature D is advanced beyond the Figure 14 position. It will be noted that the armature may be moved in either direction from any of these minor or sub-stations; as, for example, it may be moved from Figure 1 position to Figure 14 position by simply cutting out the coils H and J and cutting in the coil I; the switches H', I' and J' for the resistance coils forming a part of the preferred system of permutation mechanism.

At Figure 15, all of the resistance coils, which are arranged in parallel, cut into the circuit through the magnet B, which therefore has $\frac{7}{8}$ of full amperage, and hence is nearly as strong as the magnet A, so that the armature is set at Figure 15 nearly to its midway station, seen at Figure 8.

It will be understood that by the use of the rheostat a large variety of modifications of the magnet A may be effected. By introducing the coil I into a magnet circuit, only $\frac{1}{8}$ of full amperage is gained; by using H, only $\frac{1}{4}$; by using both H and I, $\frac{3}{8}$; by using J alone. $\frac{1}{2}$; by using J and I, $\frac{5}{8}$; by using J and H, $\frac{3}{4}$; and by using J, I and H, $\frac{7}{8}$, as seen at Figure 15. It will also be understood that the rheostat may be used in connection with any field magnet singly, while the magnet used in combination therewith has full amperage.

The armature may thus be positioned at any one of eight different stations between the positions at Figures 2 and 15; and by the same method of manipulation, the armature may likewise be positioned at any one of eight different stations between the positions at Figures 2 and 13. At Figure 16, the magnet B, for illustration, is shown as receiving full amperage, while the magnet A is only $\frac{1}{4}$ as strong, and the position of the armature D is determined by the combination of the strong and weak magnets, as will be understood from the foregoing description.

This gives, in this illustration of the invention, sixteen armature stations in the neighborhood of each pole of each magnet, or ninety-six stations in all, when using the three magnets as illustrated. It will further be understood that the armature may move from any station in the circle in either direction to any one of thirty-two or more stations, according to the power and number of the magnets, at a single stroke. Thus the device may be regarded as a universal position-finder, since from any station in the circle it may move in either direction to any one of a large number of other stations, having a great range of length of stroke, and useful in a variety of machines.

Variations may be resorted to within the scope of the invention, and portions of the improvements may be used without others.

Having thus described my invention, I claim:

1. A selective position-finder comprising a movable magnet, energizing means therefor, a plurality of electro-magnets to effect movements thereof, and means individual to the electro-magnets for energizing them in any sequence.

2. A selective position-finder comprising a revoluble magnet, energizing means therefor, a plurality of electro-magnetic devices in position to co-operate therewith, each electro-magnetic device included in a separate circuit, and means for closing and opening the circuits in any sequence, to cause the revoluble magnet to turn backwardly or forwardly as required at successive position-finding operations.

3. A selective position-finder comprising a revoluble armature, a circuit in which it is included, said circuit provided with a reversing device, and a plurality of field electro-magnetic circuits, each having an individual circuit-closer, to permit the circuits to be closed in any sequence.

4. A selective position-finder comprising a revoluble armature, a circuit in which it is included, a set of field electro-magnets, means adjustable for effecting a relative reversal between the armature and the field magnets, and means adjustable for energizing and de-energizing the field magnets selectively in any sequence, to bring the armature to and maintain it at different desired stations.

5. A position-finder comprising a revoluble magnet, energizing means therefor, a circle of electro-magnets, and means for energizing the electro-magnets in any sequence for positioning said revoluble magnet at various stations in its revolution.

6. A positioning device comprising a revoluble armature, an energizing circuit therefor, a set of field electro-magnets therefor provided with individual circuits, and means, inclusive of circuit-closers and also inclusive of reversing devices, for selectively positioning said armature at various stations in any sequence.

7. A position-finder comprising, in combination, a revoluble armature, a circuit in which it is included, said circuit provided with a reversing device, and a set of field electro-magnets provided with individual circuits each having a circuit-closer, and one thereof having a reversing device.

8. The combination of a movable magnet, a pole-changer therefor, a plurality of electro-magnets to co-operate with said movable magnet, and means operable in any sequence for positioning said movable magnet by either of said electro-magnets, to position the movable magnet at either of two main stations, or by the electro-magnets jointly at a midway station.

9. The combination of a revoluble magnet, energizing means therefor, a set of field electro-magnets, and means operable in any sequence for positioning said revoluble magnet either at any of certain main stations, by energizing the field magnets individually, or at any of certain intervening stations, by energizing adjacent field magnets jointly.

10. A selective positioning device comprising, in combination, a revoluble armature, a reversible circuit in which it is included, a plurality of field electro-magnets, and means effective in any sequence for energizing certain field magnets, either individually or jointly.

11. A selective positioning device comprising, in combination, a revoluble armature, a reversible circuit in which it is included, a complement of sets of field electro-magnets, one of said sets being included in a reversible circuit, and means effective in any sequence for energizing any set individually or any selection of adjacent sets jointly.

12. A selective positioning device comprising a revoluble armature, a circuit in which it is included, a plurality of field magnets, means adjustable for effecting a relative reversal between the armature and the field magnets, and means adjustable for energizing and de-energizing field magnets selectively either individually or jointly in a manner to control the position of the armature either by any field magnet individually or by any adjacent field magnets jointly.

13. A positioning device comprising a revoluble magnet, energizing means therefor, a circle of sets of electro-magnets, and means, including a system of independently adjustable devices, for energizing the sets either individually or in combination, for positioning said revoluble magnet in any sequence at a number of stations in excess of the number of electro-magnet poles.

14. A position-finding device comprising relatively revoluble co-operative members, one comprising an electro-magnet and the other comprising a plurality of electro-magnets, whereby relative revolution may be effected between said members, and means, inclusive of a system of circuit-closing and reversing devices, for selectively effecting relative positioning of said members in any sequence.

15. A positioning device comprising relatively revoluble co-operative members, one comprising an electro-magnet and the other comprising a plurality of electro-magnets, whereby relative revolution may be effected between said members, and means, inclusive of a system of circuit-closing and reversing devices, for selectively effecting relative positioning of said members, through either individual or joint action of electro-magnets in said set, in any sequence.

16. The combination of an armature, a reversible circuit in which it is included, a set of electro-magnets, whereby relative revolution may be effected between said armature and said set, one of the electro-magnets in said set having a reversing device, and means for energizing any magnet in said set, either individually or jointly with a combinational magnet.

17. The combination of two members having electro-magnets whereby relative revolution may be effected between said members, and a system of devices to control said electro-magnets in any sequence to effect relative positioning and holding of said members at a variety of stations.

18. The combination of two members having electro-magnets whereby relative revolution may be effected, certain of said magnets arranged in sets, and a system of controlling devices, inclusive of circuit-closers and current-reversing means, to control certain of said sets either individually or jointly with combinational sets to effect relative revolution of said members in either direction selectively, and relative positioning of said members either at stations determined by individual sets selectively or at intervening stations determined selectively by combinational sets acting jointly.

19. A system of electro-magnetic devices, of which one portion is mounted for to and fro movement relatively to the other portion, such relative movement effectible by the co-operation of devices in one of said portions with devices in the other of said portions, and a system of selective controlling devices effective on both of said portions and capable of causing relative to and fro movements of said portions to selected stations in any sequence.

20. The combination of relatively movable members, one comprising a magnetic device and the other comprising a plurality of electro-magnets to co-operate therewith to effect relative movement of said members, means for energizing said magnetic device, means for selectively positioning the movable member either by the use in any sequence of the electro-magnets individually or by their joint use, and means for varying the power of one of said electro-magnets, to vary the joint effect of said electro-magnets and thereby position said movable member at a different station.

21. The combination of relatively movable members, one comprising a magnetic device and the other comprising a plurality of electro-magnets to co-operate therewith to effect relative movement of said members, means for energizing said magnetic device, said electro-magnets having individual circuits, means for positioning the movable member either at certain stations selectively by the use in any sequence of the electro-magnets individually or at an intervening station by the use of the electro-magnets jointly, and means for varying the power of either of said electro-magnets.

22. The combination of a member including an armature, a member including a set of field electro-magnets whereby relative rotation may be effected between said armature and said field, means for selectively energizing field magnets in combination in any sequence, means for varying the power of individual magnets, to enable each combination of magnets to position the revoluble member at a variety of stations in any sequence, and means for effecting a relative reversal of circuit between said armature and said set of field magnets.

23. The combination of a revoluble armature, a complement of field electro-magnet sets, one whereof is individually reversible, means for selectively energizing any set individual or any selection of combinational sets jointly, means for varying the power of any set, and means for effecting a relative reversal of circuit between said armature and said complement of sets.

24. The combination of relatively revoluble members comprising an armature member and a member including a plurality of field magnets, an armature circuit, and a permuting mechanism, including circuit-closing, reversing and power-controlling devices, for energizing the magnets either individually or in combination and for varying the power of individual magnets, to position the revoluble member at a number of stations in excess of twice the number of field magnet poles, in any sequence.

25. The combination of a system of electro-magnetic devices, of which one portion is mounted for to and fro movement relatively to the other portion, such relative movement effectible by the co-operation of devices in one of said portions with devices in the other of said portions, said system including electro-magnetic devices capable of selection in any sequence for either individual or joint use, and a permutable system of controlling devices capable of causing relative to and fro movements of said portions to stations as determined either by individual electro-magnetic devices selectively, or by the combination of selected combinational electro-magnetic devices, said permutable system also including means for varying the power of certain magnets and means for reversing the polarity of certain of said magnets.

26. A selective positioning device comprising a magnet, electro-magnets to co-operate therewith, in any sequence to effect relative movement, reversible energizing means for said magnet, means for energizing different combinations of said electro-magnets selectively, and means for effecting various modifications of the power of one of said magnets.

27. A selective positioning device comprising two members provided with electro-magnets for effecting relative rotation between them, means for energizing certain of said electro-magnets in any sequence either individually or in combination, means for effecting various modifications of the power of any magnet used in combination, and means, including reversing devices, for energizing certain of said electro-magnets.

28. The combination of a revoluble armature in a reversible circuit, a plurality of field electro-magnets provided with individual circuits each having a circuit-closer, said circuit-closers operable in any sequence, and means for effecting various modifications in the power of any of said field magnets individually.

29. The combination of a revoluble armature in a reversible circuit, a plurality of field electro-magnets provided with individual circuits each having a circuit-closer, and means for effecting various modifications in the power of any of said field magnets individually, one of said field magnets provided with a reversing device.

30. The combination of members, one having an electro-magnet and a pole-changer therefor, and the other having a set of individual electro-magnets to co-operate therewith to effect relative movement between said members, means capable of operation in any sequence for selectively positioning the movable member at stations determinable solely by any of the individual electro-magnets in said set, or at intervening stations determinable by selected combinations of individual magnets, and means for effecting various modifications in the power of any electro-magnet singly in any selected combination.

31. A selective positioning device comprising, in combination, a revoluble armature, a reversible circuit in which it is included, a complement of sets of field electro-magnets, one of said sets being included in a reversible circuit, means for energizing any set individually or any selection of adjacent sets jointly, and a current-regulator connectible to any one of said sets individually.

32. A selective positioning device comprising a revoluble armature, a circuit in which it is included, a plurality of field magnets, means adjustable for effecting a relative reversal between the armature and the field magnets, means adjustable for energizing and de-energizing field magnets selectively either individually or jointly in a manner to control the position of the armature either by any field magnet individually or by any adjacent field magnets jointly, and means for variously modifying the effect of the joint action of any combined field magnets.

33. A positioning device comprising a revoluble magnet, a circle of sets of electro-magnets, and means, including a system of permutation devices, for energizing the sets either individually or in combination, and for variously modifying the power of any set, for positioning said revoluble magnet at a number of stations in excess of four times the number of electro-magnet poles, in any sequence.

34. The combination of co-operative members, one comprising an electro-magnet and the other comprising a set of electro-magnets whereby relative revolution may be effected between said members, a pole-changer for the first-mentioned electro-magnet, means for effecting relative positioning of said members through joint action of selectively combined electro-magnets in said set, and means for effecting various modifications of the power of any electro-magnet in said set.

35. The combination of a system of electro-magnetic devices, of which one portion is mounted for to and fro movement relatively to the other portion, such relative movement effectible by the co-operation of devices in one of said portions with devices in the other of said portions, said system including electro-magnetic devices capable of selection for either individual or joint use, a permutable system of controlling devices capable of causing relative to and fro movements of said portions to stations as determined either by individual electro-magnetic devices selectively, or by the combination of selected combinational electro-magnetic devices, and a rheostat connectible to any of said individual electro-magnetic devices.

36. The combination of an armature and an armature circuit provided with a pole-changer; a plurality of sets of field magnets in individual circuits, one of said individual circuits provided with a pole-changer; a main connected to the armature circuit; a rheostat; and means for connecting any one of said individual circuits either directly or through said rheostat to said main.

37. The combination of an armature and an armature circuit provided with a pole-changer; a plurality of sets of field magnets in individual circuits, one of said individual circuits provided with a pole-changer; a main connected to the armature circuit; a rheostat; means for connecting any one of said individual circuits either directly or through said rheostat to said main; said rheostat including an assortment of resistance coils connected in parallel; and means for bringing into use any one or more of said coils.

38. The combination of an armature and an armature circuit provided with a pole-changer; a plurality of sets of field magnets in individual circuits, one of said individual circuits provided with a pole-changer; a main connected to the armature circuit; and a rheostat; each of said individual circuits provided with a switch to connect it to said main either directly or through said rheostat, or to disconnect the circuit from said main.

39. The combination of an armature and an armature circuit provided with a pole-changer; a plurality of sets of field magnets in individual circuits, one of said individual circuits provided with a pole-changer; a main connected to the armature circuit; a rheostat; each of said individual circuits provided with a switch to connect it to said main either directly or through said rheostat, or to disconnect the circuit from said main; said rheostat including an assortment of resistance coils connected in parallel; and means for bringing into use any one or more of said coils.

40. The combination of an armature; a plurality of field magnets in individual circuits; a main connected to the armature circuit; a rheostat; each of said individual circuits provided with a switch to connect it to said main either directly or through said rheostat, or to disconnect the circuit from said main; said rheostat including an assortment of resistance coils connected in parallel; and means for briging into use any one or more of said coils.

JOSEPH ROSCHACH.

Witnesses:
M. E. MERTZ,
EDITH B. LIBBY.